United States Patent [19]

Sloane, Jr. et al.

[11] 3,769,744

[45] Nov. 6, 1973

[54] TELEPHONE TOY WITH PHONOGRAPH

[75] Inventors: Thomas E. Sloane, Jr., Rolling Hills Estates; William Hart; William B. Pester, both of Palos Verdes Peninsula, all of Calif.

[73] Assignee: Mattel, Inc., Hawthorne, Calif.

[22] Filed: Aug. 4, 1972

[21] Appl. No.: 278,133

[52] U.S. Cl. .................................. 46/33, 46/175 AR
[51] Int. Cl. .............................................. A63h 33/30
[58] Field of Search ........................... 46/33, 175 AR

[56] References Cited

UNITED STATES PATENTS

| | | | |
|---|---|---|---|
| 3,165,320 | 1/1965 | Ryan | 46/175 AR |
| 3,509,658 | 5/1970 | Degaetano | 46/33 |
| 3,591,974 | 7/1971 | Thornell | 46/33 |

*Primary Examiner*—F. Barry Shay
*Assistant Examiner*—Robert F. Cutting
*Attorney*—Seymour A. Scholnick

[57] ABSTRACT

A toy telephone which utilizes a self-contained phonograph module that is securely held in a position that permits easy operation and which efficiently couples the output of the module to the handset of the telephone. The telephone housing has a record-receiving slot aligned with the phonograph module slot, and has a supporting wall opposite the slot with a raised strap-like portion that resiliently biases the module against the slotted wall of the telephone housing. A sound collector is mounted on the module housing over the speaker cone thereof, the sound collector having a flat wall facing the speaker cone and a flange extending around the periphery of the speaker cone and forming a tapered region at one side where the collector connects to a flexible tube that leads to the handset. The handset has an elongated tubular member that tapers in cross section from a narrowest end which connects to the flexible tube to a widest end that opens to the listening end of the handset.

8 Claims, 6 Drawing Figures

TELEPHONE TOY WITH PHONOGRAPH

BACKGROUND OF THE INVENTION

This invention relates to toy telephones.

A toy telephone simulating a real telephone, can be provided by a telephone base housing with a phonograph, a handset, and a flexible tube that connects the phonograph to the handset so that sounds eminate from the handset. The versatility of the phongraph is increased by using a phonograph mechanism that permits the rapid change of records. A simple phonograph mechanism which permits the rapid change of records has been developed and is described in detail in U.S. Pat. No. 3,666.274, which issued May 30, 1972. That phonograph mechanism utilizes a substantial number of complicated parts, and considerable time and expense is involved in tooling for the mass production of such a phonograph and in refinement of design for optimum operation. It would be desirable if the rapid change phonograph could be assembled and tested as a standard phonograph module, apart from the telephone, so that the same module design can be utilized for a variety of different toys that can utilize such a module, and so that the module can be assembled and tested prior to assembly in the telephone. However, the telephone toy must be constructed to hold the phonograph module securely in a position that permits proper operation of the phonograph, and should efficiently couple the phonograph output to the handset of the telephone.

SUMMARY OF THE INVENTION

In accordance with one embodiment of the present invention, a toy telephone is provided which utilizes a phonograph module that plays changeable records, and which efficiently couples the output of the module to the listening end of the telephone handset. The telephone includes a telephone base housing which has a slot in an upper wall thereof that is aligned with the slot of the phonograph module through which the records are received. The telephone housing also has a lower wall with a raised strap-like portion that biases the module upwardly to eliminate any gap between the slot in the telephone housing and the slot in the phonograph module. A sound collector is mounted over the speaker cone of the phonograph module to collect the sound output and transmit it through a flexible tube to the handset. The sound collector includes a flat backing wall facing the speaker cone, and a flange or side wall extending from the backing wall towards the speaker cone. The sidewall forms a sound collecting region which tapers at one side to an output where the sound collector connects to the flexible tube. The handset includes an elongated, hollow member that is tapered in cross-section between a first end that is located at the talking end of the handset and which connects to the flexible tube, and a larger open end at the listening end of the handset.

The novel features of the invention are set forth with particularity in the appended claims. The invention will be best understood from the following description when read in conjunction with the accompanying drawings.

Figure 1:
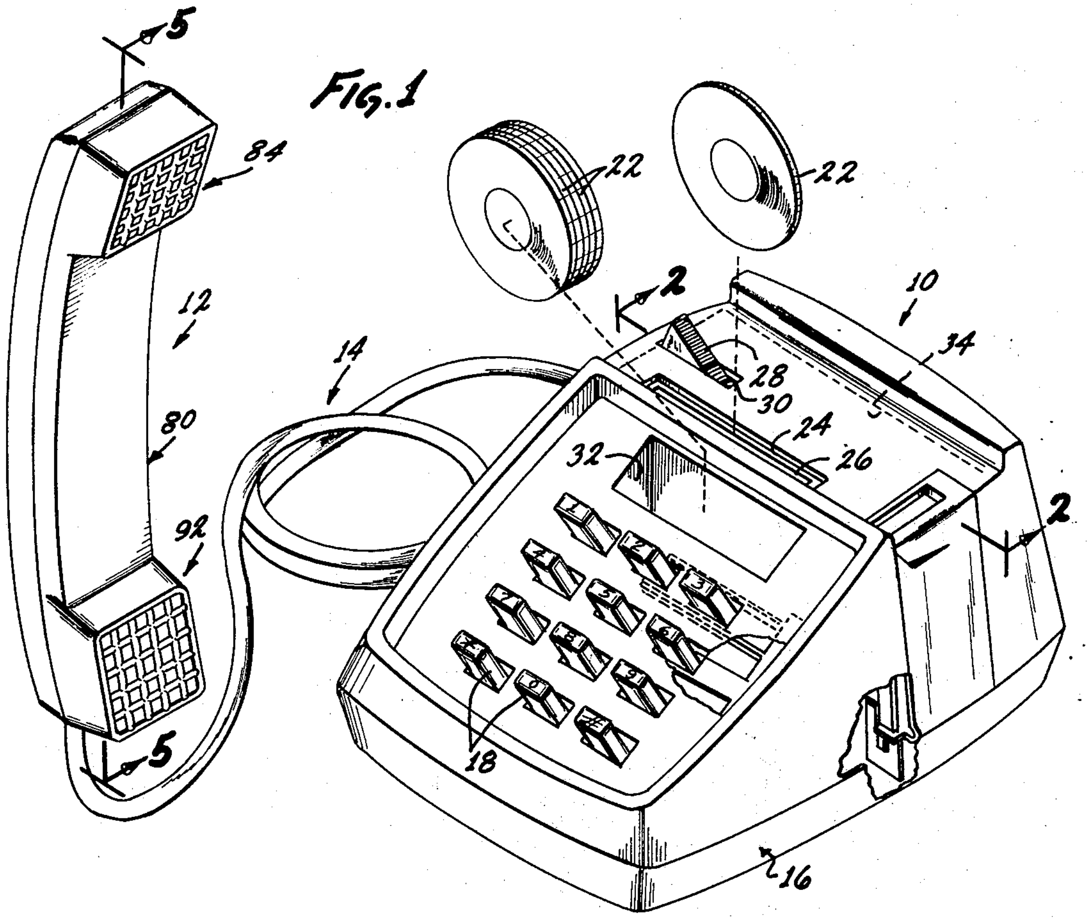
FIG. 1 is a perspective view of a telephone toy constructed in accordance with the invention.
Figure 2:
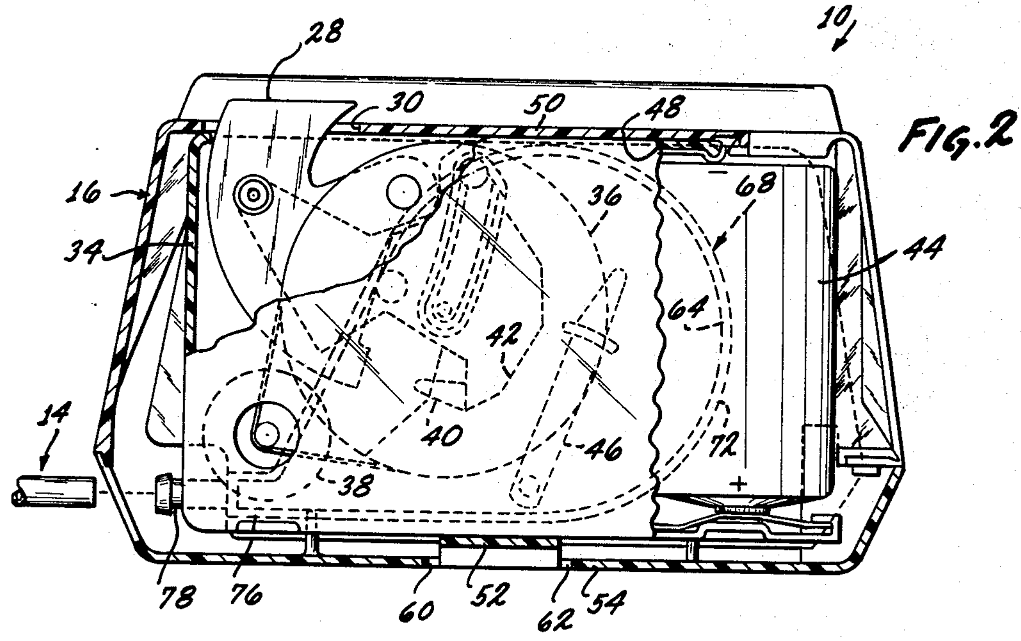
FIG. 2 is a view taken on the line 2—2 of FIG. 1.

DESCRIPTION OF THE PREFERRED EMBODIMENT:

FIG. 1 illustrates the toy telephone, which includes a telephone base 10, a handset 12 and a flexible tube 14 which connects the base to the handset. The base 10 includes a base housing 16, which represents a modern telephone with depressable pushbuttons 18. A phonograph in the form of a self-contained module 20 is mounted in the telephone housing 16 to provide sounds that are carried through the tube 14 to the handset, so that the sounds emanate from the handset in a manner simulating a real telephone. The phonograph is of a type which can play changeable disc records 22. A record 22 is played by merely inserting it through a slot 24 of the telephone housing and through a slot 26 of the phonograph module. The phonograph begins playing the record as soon as it is inserted and stops at the end of the record. A new record can be inserted by depressing an eject lever 28 on the phonograph module that projects through a slot 20 in the telephone housing, which causes the record already in the phonograph to move up so its rim is exposed for removal, and by inserting another phonograph in its place. A record-holding depression 32 is formed in the telephone housing to provide a convenient storage area for several phonographs.

Referring also to the other figures, it can be seen that the phonograph module 20 includes a module housing 34 which holds substantially all of the working parts of the phonograph. A turntable 36 is rotatably mounted within the module housing so that a face of the turntable is aligned with the slot 26, and the turntable is rotatably driven by a motor 38. When a record is inserted into the phonograph, the record pushes against a tab 40 on an operating lever 42, which closes a pair of electrical contacts (not shown) that carry current from an electric battery 44 to the motor 38. The lever 42 also allows a tone arm 46 to move against the record and begin playing it, and moves the reject lever 28 upwardly. When the record is fully inserted, the rim of the record extends approximately even with an upper wall 48 of the phonograph module housing 34 which is the wall in which the record-passing slot 26 is formed. It is desirable that there be no gap between the upper wall 48 of the phonograph housing and the wall 50. If a large gap is present, it may be difficult for children to fully insert the record into the phonograph. Of course, the telephone housing 16 may be dimensioned so that the height of its module-receiving portion precisely equals that of the phonograph module so the upper wall of the module lies against the upper wall of the telephone housing. However, large tolerances must be provided so there are considerable variations in height between different modules and telephone housings, particularly if the telephone housing is to be produced at low cost.

Figure 3:
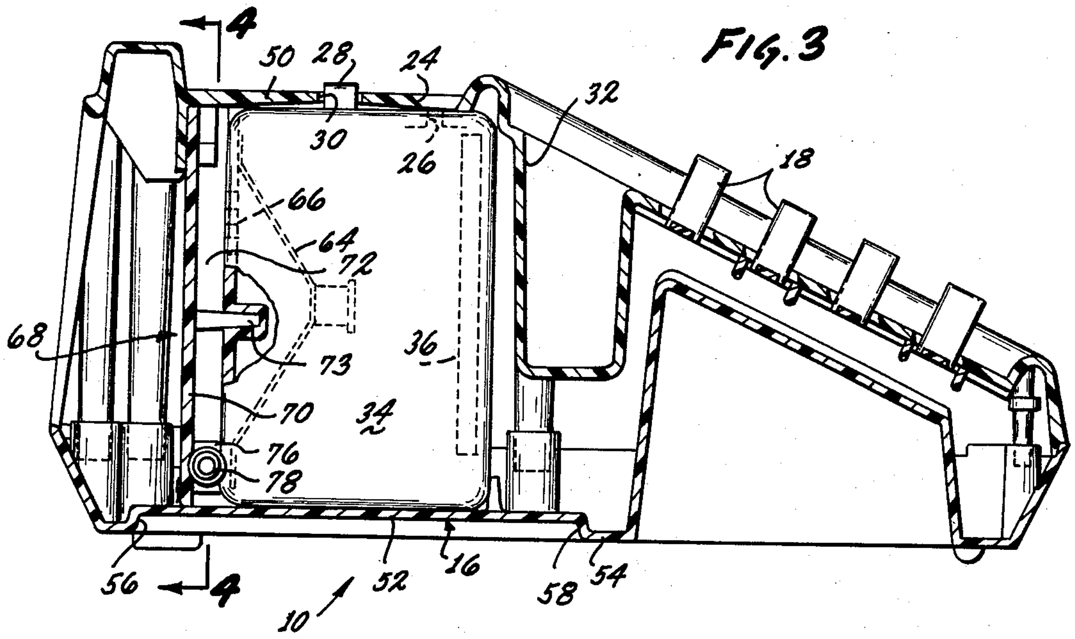
FIG. 3 is a sectional side view of the base of the telephone of FIG. 1.

In order to permit considerable variation in the height of the telephone housing and yet hold the phonograph module securely in place and with the upper wall 48 of the module against the upper wall 50 of the telephone housing, the telephone housing is provided with a resiliently deformable support member 52. The support member 52 is a strap-like portion formed in a bottom wall 54 of the telephone housing 16, and that is raised above the level of the surrounding bottom wall portions. The support member or strap 62 merges with the rest of the bottom wall at its opposite ends 56, 58 (FIG. 3), but is separated by a pair of parallel slots 60, 62 along either side from adjacent portions of the bottom wall 54. The strap 52 engages the module 20 at locations on the strap spaced from its opposite ends 56, 58 so that the strap 52 can be depressed by the module. The telephone housing 16 is constructed so that the distance between the bottom surface of the top wall 50 and the upper surface of the strap 52 is slightly less than the height of the phonograph module housing. Thus, the strap 52 is always depressed slightly when the phonograph module is installed. The phonograph module is therefore securely held in position against rattling, and its upper wall 48 is pressed against the upper wall 50 of the telephone housing to substantially eliminate any gap between the slots in the telephone and phonograph module housings through which the disc record passes.

Figure 4:
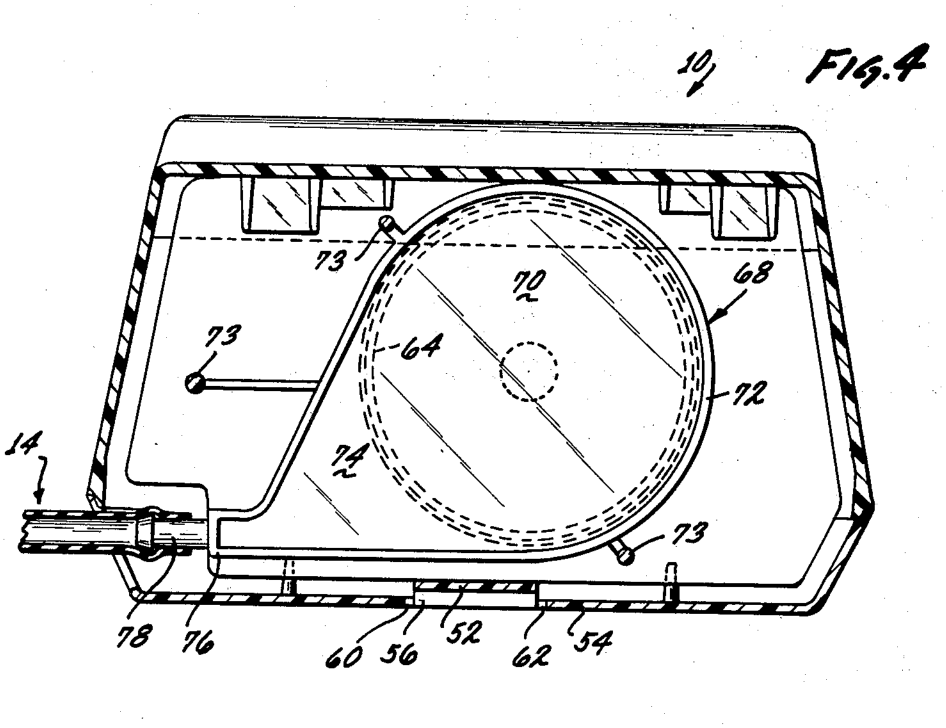
FIG. 4 is a view taken on the line 4—4 of FIG. 3.

The phonograph module 20 contains a speaker cone 64 that is located behind a perforated wall 66 of the module housing. A sound collector 68 is provided to efficiently couple the speaker cone to the flexible tube 14 so that the sound produced by the phonograph can be clearly heard at the handset. The sound collector 68 includes a back wall 70 which is spaced from the speaker cone 64 and which faces it. A flange or side wall 72 extends from the back wall 70 towards the speaker cone. Three pins 73 extend from the sound collector to holes in the module housing to hold the sound collector in place on the module. The side wall 72 of the sound collector extends substantially along the periphery of the speaker cone 66 except at one side of the speaker cone where the side wall forms a collector region 74 (FIG. 4), that extends sidewardly away from the periphery of the speaker cone 66 and that tapers in width to an output 76. The output 76 is narrow and has a tubular portion 78 that can fit into an end of the flexible tube 14 to connect to it. The sound collector 68 gathers a large portion of the sound energy emanating from the loudspeaker and concentrates it at the output end 36 so that considerable sound energy passes through the tube 14 and through an aperature 79 in the telephone housing to the handset.

Figure 5:
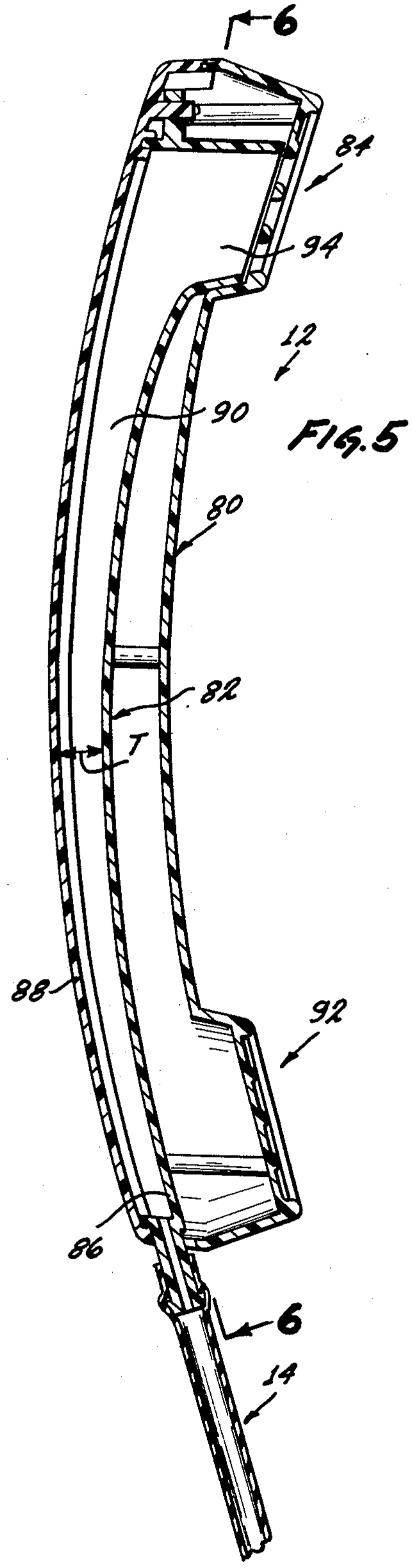
FIG. 5 is a view taken on the line 5—5 of FIG. 1.
Figure 6:
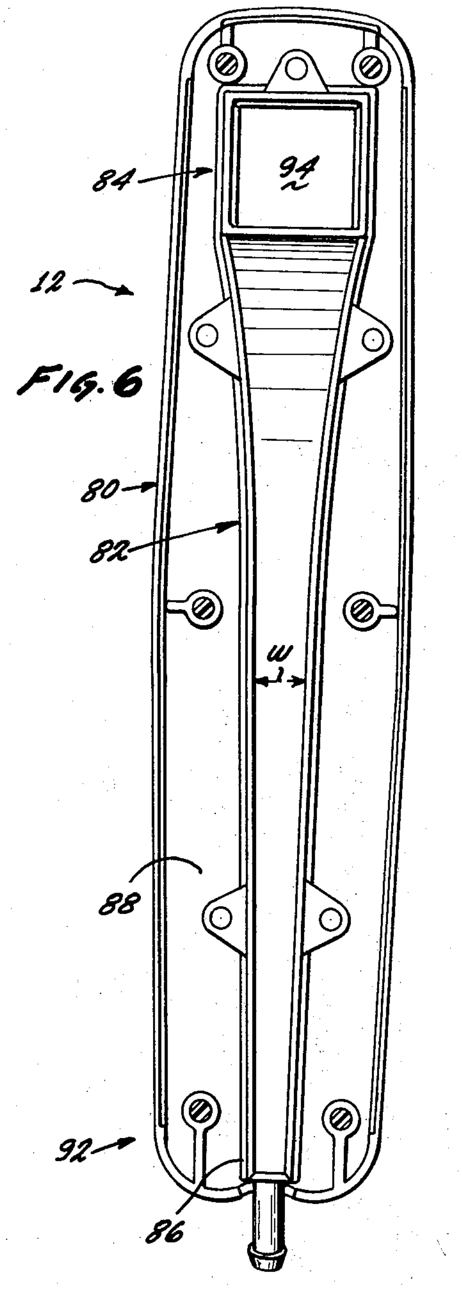
FIG. 6 is a view taken on the line 6—6 of FIG. 5.

The handset 12, best shown in FIGS. 5 and 6, includes a handset housing 80 of a shape similar to that of a modern telephone, and an elongated hollow member 82 that forms an efficient speaker. The hollow member 82 utilizes the length of a typical handset to gradually expand the cross sectional area of the sound-carrying passageway so that a large volume of air can be vibrated at the listening end 84 of the handset. The hollow member 82 has a first end 86 which forms a short tube that can receive an end of the flexible tube 14. The rest of the hollow member 82 forms three walls of a tube, the hollow member being open along a region facing the back wall 88 of the handset housing 80, and the back wall 88 and hollow member 82 form a tube for the passage of sound. The tube 90 formed by the hollow member 82 and back wall 88 is tapered so that it has a smallest cross section of the same order of magnitude as the cross section of the tube 14 at the talking end 92 of the handset, and the cross sectional area gradually increases to the listening end 84 of the handset. The tube 90 is tapered both in width W and thickness T along its length, and provides an efficient coupling between the tube 14 and the much larger opening 94, so that the concentrated sound energy in the tube 14 can vibrate a substantial amount of air at the open end 94 to create a sound that is louder to the human ear than would be created by extending the narrow tube 14 to the listening end of the handset.

Thus, the invention provides a versatile and realistic toy telephone that can securely hold a phonograph module in a position that facilitates operation of the phonograph mechanism, and which efficiently couples the output of the phonograph module to the listening end of the handset. The telephone base housing has a region where the phonograph module is received and has a slot that is aligned with the slot in the phonograph module. A wall of the telephone housing opposite the slot therein is formed with a resiliently deformable support member that holds the phonograph securely in position. The support member is in the form of a raised elongated region of a wall, this raised region being connected at its opposite ends to the surrounding wall of the telephone housing, but separated by a pair of slots on either side from the surrounding wall, so that it can flexibly deform apart from the surrounding wall. A sound collector is mounted on the phonograph module opposite the speaker cone of the module to efficiently collect sounds for transmittal through a flexible tube to the handset. The sound collector includes a backing wall spaced from the speaker cone and facing it, and a side wall surrounding the speaker cone and forming a tapered collector region that concentrates the sound to an output where an end of the flexible tube is connected. The sound transmitted through the flexible tube is efficiently utilized at the handset by providing an elongated tubular passageway that is tapered in cross-sectional area and that utilizes the length of the handset to conceal the tapered passageway. This expansion tube is provided by an elongated hollow member and a back wall of the handset housing, so that a unitary elongated tube does not have to be formed. The gradually increasing cross sectional area of the passageway enables the sound energy passing through the flexible tube to be acoustically amplified so that a loud sound emanates from the listening end of the handset.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A telephone toy comprising:

a telephone housing with a phonograph module receiving region, said housing having a slot on top of said region and a bottom wall under said region, said bottom wall including a resiliently deformable support member;

a phonograph module disposed in said module receiving region, said phonograph module having a module frame with an upper wall, said upper wall, having a slot therein aligned with the slot in the telephone housing, and module frame having a height greater than the distance between the undeflected support member and the wall of the telephone housing forming the slot therein, so that the upper wall of the module frame is held against the slotted wall of the telephone housing, whereby to avoid a gap between the slots.

2. The telephone toy described in claim 1 wherein: said telephone housing includes a bottom wall with a pair of parallel slots defining a strap portion therebetween which forms said support member, said strap portion extending upwardly at its opposite ends from the bottom housing wall so that the strap portion lies above the height of the surrounding bottom wall portions, and said strap portion engaged with said module at locations spaced from its ends.

3. The telephone toy described in claim 1, including:
a handset;
record playing means including speaker cone means mounted in said phonograph module;
a sound collector mounted within said telephone housing adjacent said speaker cone means; and
a flexible tube connecting said sound collector to said handset to carry sounds to said handset so they appear to emanate therefrom;
said sound collector including a back wall spaced from the speaker cone means and facing it, and a side wall extending substantially along the periphery of the speaker cone means except at one side of the speaker cone means where the side wall forms a collector region that extends sidewardly away from the periphery of the speaker cone means and that tapers in width to an output where the collector region connects to an end of said flexible tube.

4. The telephone toy described in claim 3 wherein: said handset includes an elongated handset housing with talking and listening ends, and an elongated hollow member in said handset housing, said hollow member having a talking end located at the talking end of the housing and connected to said tube and a second end located at the listening end of the housing, said hollow member forming a chamber tapered in width and thickness between its ends with a smallest width and thickness at the talking end and a greatest width and thickness at the listening end and open at the listening end.

5. The telephone toy described in claim 3 wherein:
said module frame has a perforated wall over said speaker cone means;
said sound collector has means for attaching it to said module frame over said perforated wall; and
said telephone housing has an aperture that permits the carrying away of sound through said tube and sound collector output.

6. A telephone toy comprising:
a telephone base housing;
a phonograph mounted in said base housing;
an elongated handset; and
a flexible tube coupling said phonograph and said handset;
said handset including an elongated hollow member tapered in cross-section between a narrowest first end which lies at one end of said handset and is connected to said tube and a largest second end which lies at an opposite end of said handset and is open.

7. The telephone toy described in claim 6 wherein: said phonograph includes a speaker cone and sound collector, said sound collector including a flat backing wall spaced from the speaker cone and facing it, a flange extending towards the speaker cone and around it and forming a collection region which tapers in width at one side, and a tubular region forming a tubular passageway communicating with said tapered collection region and connected to an end of said flexible tube.

8. The telephone toy described in claim 6 wherein: said hollow member is open along one side, and said handset housing forms a wall at said open side so that the hollow member and back wall of the housing form a tube between the opposite ends of the handset.

* * * * *